United States Patent
Pywell et al.

(10) Patent No.: US 6,231,072 B1
(45) Date of Patent: May 15, 2001

(54) HEADLINER BASED SUPPLEMENTAL RESTRAINT ASSEMBLY

(75) Inventors: James Frederick Pywell, Shelby Township; Bassam Georges Khoudari, Sterling Heights, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/419,601

(22) Filed: Oct. 15, 1999

(51) Int. Cl.$^7$ ...................................................... B60R 21/22
(52) U.S. Cl. .......................................... 280/730.2; 296/214
(58) Field of Search ................................. 280/730.2, 753; 296/214, 222

(56) References Cited

U.S. PATENT DOCUMENTS

| | | |
|---|---|---|
| 5,265,903 | 11/1993 | Kuretake et al. . |
| 5,322,322 * | 6/1994 | Bark et al. .......................... 280/730.2 |
| 5,362,097 * | 11/1994 | Barske ............................... 280/730.1 |
| 5,382,051 | 1/1995 | Glance . |
| 5,439,248 | 8/1995 | Steffens, Jr. et al. . |
| 5,447,326 | 9/1995 | Laske et al. . |
| 5,462,308 * | 10/1995 | Seki et al. ............................. 280/749 |
| 5,470,103 * | 11/1995 | Vaillancourt et al. ............. 280/730.1 |
| 5,490,691 | 2/1996 | Sinnhuber et al. . |
| 5,540,459 | 7/1996 | Daniel . |
| 5,641,196 * | 6/1997 | Homann et al. ...................... 296/222 |
| 5,730,464 | 3/1998 | Hill . |
| 5,775,726 * | 7/1998 | Timothy et al. .................. 280/730.2 |
| 5,788,270 | 8/1998 | Håland et al. . |
| 5,791,683 * | 8/1998 | Shibata et al. .................... 280/730.2 |
| 5,865,462 | 2/1999 | Robins et al. . |
| 5,899,489 * | 5/1999 | Jost .................................. 280/730.2 |
| 5,921,575 | 7/1999 | Kretschmer . |
| 6,070,902 * | 6/2000 | Kowalski et al. ................. 280/730.2 |
| 6,102,435 * | 8/2000 | Wallner et al. .................... 280/730.2 |
| 6,106,007 * | 8/2000 | Kretschmer et al. ............. 280/730.2 |

* cited by examiner

Primary Examiner—Robert P. Olszewski
Assistant Examiner—Lynda Jasmin
(74) Attorney, Agent, or Firm—Kathryn A. Marra

(57) ABSTRACT

A supplemental restraint assembly includes an air bag disposed between a vehicle's roof and the headliner adjacent the side of the vehicle. During deployment of the supplemental restraint assembly, the air bag inflates causing the headliner to extend downward towards an occupant's head and upper torso. The headliner forms a reactionary surface between the occupant and the inflated air bag. An extendable frame assembly disposed between the roof and headliner is preferably employed to positively position the headliner reactionary surface during a side impact or rollover event. The frame assembly maintains the headliner in the extended position after the air bag deflates.

18 Claims, 3 Drawing Sheets

HEADLINER BASED SUPPLEMENTAL RESTRAINT ASSEMBLY

BACKGROUND OF THE INVENTION

1. Field of the Invention

This invention relates to a supplemental restraint assembly for protecting vehicle occupants and more particularly to a headliner based supplemental restraint assembly.

2. Description of the Related Art

Air bags mounted in an instrument panel or steering wheel to protect an occupant from a front impact have become well-known in the automotive industry. Numerous variations of these air bags, deployment systems and housing devices have evolved over the years.

Side impact air bag systems are also known in the art. These side impact air bags are often mounted adjacent the vehicle's roof rail, doorframe or center pillars, or in some instances within the side door. For example, it is known to provide air bags that have upper head and torso protection that simultaneously inflate from the vehicle door, roof rail or seat to protect the vehicle occupant during side impact or roll over events.

It is also known in the prior art to provide longitudinally extending rigid inflatable tubes that extend across a selected area of the vehicle between the vehicle pillars. It has also been suggested to provide a side head air bag with a plurality of vertically extending inflatable cells.

SUMMARY OF THE INVENTION

It is an object of the invention to provide a side air bag that utilizes the vehicle's headliner as a reactionary surface for an occupant's head and upper torso.

A supplemental restraint assembly includes an air bag disposed between a vehicle's roof and the headliner adjacent the side of the vehicle. During deployment of the supplemental restraint assembly, the air bag inflates causing the headliner to extend or fold downward towards an occupant's head and upper torso. The headliner forms a reactionary surface between the occupant and the inflated air bag. An extendable frame assembly disposed between the roof and headliner is preferably employed to positively position the headliner reactionary surface during a side impact or rollover event and prevent upper deflection of the headliner after the air bag deflates. In order to deflect the headliner, the frame assembly must deform. The headliner and frame assembly together may help prevent occupant ejection in a rollover event and acts and an energy absorber in a side impact scenario. In an alternate embodiment, a single large bladder-lined air bag would extend beyond the front and rear pillars into the rear backlite and forward plenum regions of the vehicle. The bladder-lined air bag would sustain the time of inflation while the front, center, and rear pillars would help position the air bag within the vehicle and maintain the extended position of the headliner reactionary surface.

DETAILED DESCRIPTION OF THE PREFERRED EMBODIMENTS

Figure 1:
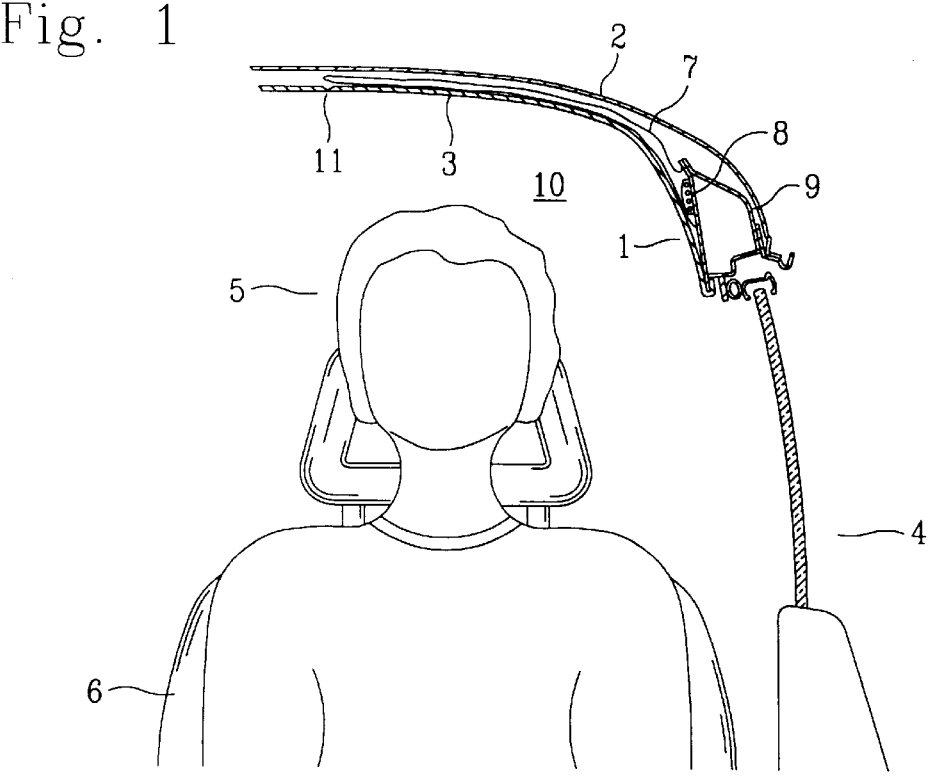
FIG. 1 is a sectional view of the supplemental restraint assembly mounted to a vehicle in a non-deployed state according to one embodiment of the present invention.

FIG. 1 depicts partial section view of a supplemental restraint assembly 1 disposed between the roof 2 and the headliner 3 of a vehicle 4 in a non-deployed state. An occupant 5 seated in seat 6 is positioned within the interior 10 of the vehicle underneath the headliner 3 proximate the supplemental restraint assembly 1. An air bag 7 and an inflator 8 are secured to a roof rail 9 and are disposed between the roof 2 and headliner 3. A longitudinally extending score line 11 is formed along the headliner 3 to facilitate downward bending of the headliner 3 within the interior space 10 of the vehicle.

Figure 2:
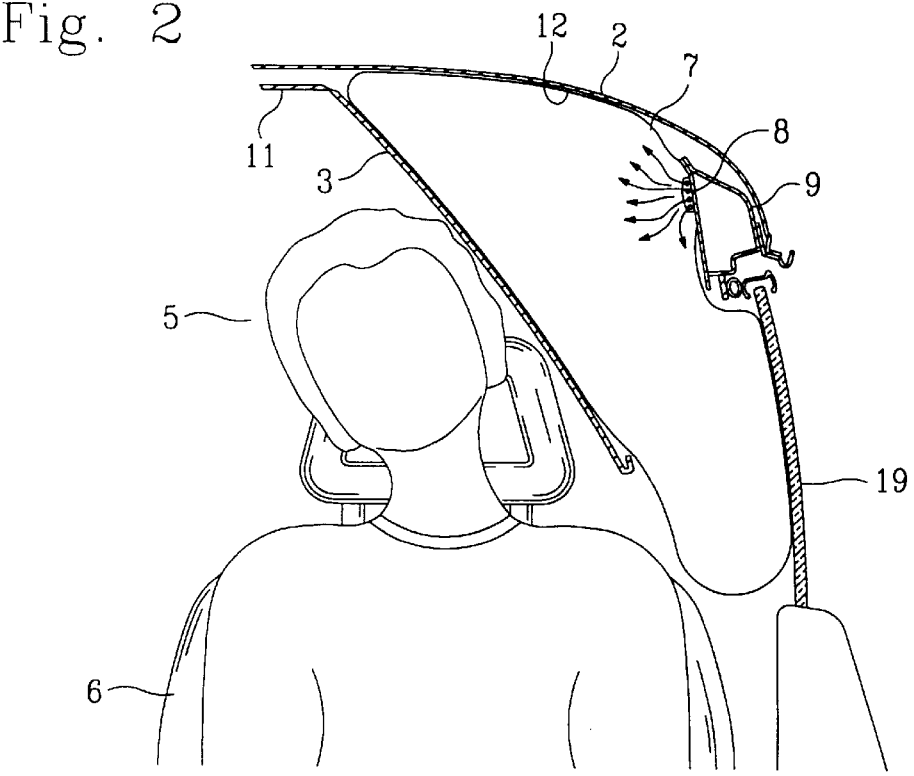
FIG. 2 is a sectional view of the supplemental restraint assembly of FIG. 1 in a deployed state.

FIG. 2 depicts the supplemental restraint assembly of FIG. 1 in a deployed state. When a side impact or rollover event is detected, the inflator 8 produces gas to inflate the air bag 7. The air bag 7 inflates expanding inward toward the interior 10 of the vehicle and downward along the side of the vehicle and side window 19. Because the air bag 7 is disposed between the headliner 3 and the roof 2, the headliner 3 is forced downward toward the occupant's head and upper torso/shoulder area. To facilitate bending of the headliner 3 about a predetermined point, a longitudinally extending score line 11 is formed along the headliner. Thus, during inflation of the air bag 7, the headliner 3 folds, or bends about the score line 11. The headliner 3 thus forms a reactionary surface between the occupant 5 and the air bag 7. Such an arrangement may help to distribute the force of the air bag and may help to provide enhanced energy absorption and promotion of occupant retention.

The headliner is detachably fastened to the vehicle roof rail 9. For example the headliner 3 may be fastened to the roof rail by rivets allowing the headliner 3 to detach from the roof rail 9. The detachable fastening being formed by slits, which are open at the ends of the headliner 3 thereby, allowing the headliner 3 to pull from rivets secured to the roof rail 9 during inflation. Other mechanisms to detachably fasten the headliner 3 to the roof rail 9 may be employed such as a tear line formed along the headliner 3 adjacent the roof rail 9, or a plurality of releasable connectors inserted to corresponding bores in the roof rail 9. The particular means to fasten the headliner 3 to the roof rail 9 or outward portion of the roof 2 is not of particular significance so long as the headliner 3 is securely fastened to the roof rail 9 during normal operation of the vehicle and allows relatively easy detachment during deployment. The headliner 3 may be formed in the conventional manner. Preferably, however, the headliner 3 is formed with an inner lining of propylene Mylar disposed between the headliner 3 and air bag 7. Such a liner increases the rigidity of the headliner 3 and reduces friction between the headliner 3 and air bag 7 during deployment. In such an arrangement, the propylene Mylar lining is also scored along score line 11 to facilitate proper deployment.

The air bag 7 is preferably made of woven nylon and has an internal bladder 12 of gas impervious material lining an internal surface of the woven nylon. Preferably the bladder 12 is made of urethane. While an internal bladder 12 is not absolutely required, such an arrangement may help to maintain inflation of the air bag for a longer time, and consequently the position of the reactionary surface/headliner for a longer time subsequent to initial inflation.

Figure 3:
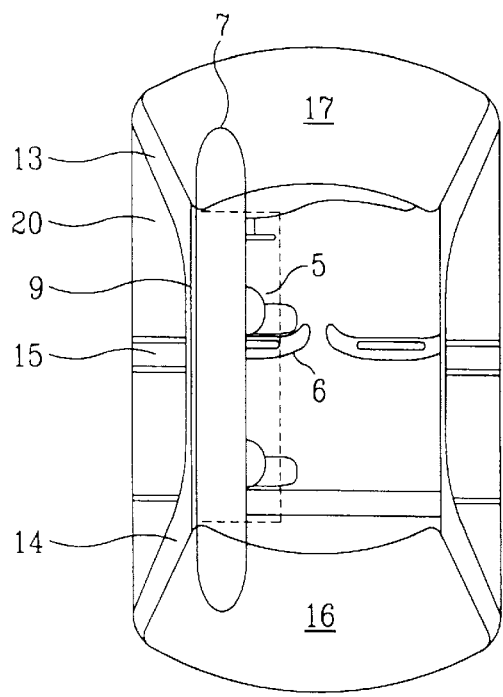
FIG. 3 is a partial schematic top plan view of the vehicle incorporating the supplemental restraint assembly of FIG. 2.

FIG. 3 is a top schematic view of the supplemental restraint system of FIG. 2. As can be seen in FIG. 2 a roof rail 9 extends between a front pillar 13 and a rear pillar 14. A central pillar 15 is depicted to represent vehicles having such a central pillar. A single air bag 7 extends rearward of the rear pillar 14 an into a rear backlite region 16 of the vehicle and forward the front pillar 13 into the plenum region 17 of the vehicle. Such an arrangement helps maintain the air bag, and consequently the occupant within the vehicle during deployment. When an occupant impacts the reactionary surface/headliner 3, the air bag 7 is urged outward and engages the front, rear and central pillars (if so equipped). Because of the length of the airbag 7, the pillars help retain the air bag 7 within the vehicle. The headliner/reactionary surface 3 is depicted in dashed lines and substantially extends the length of the vehicle's interior 10 and thus may provide protection for both front and rear seated occupants.

Figure 4:
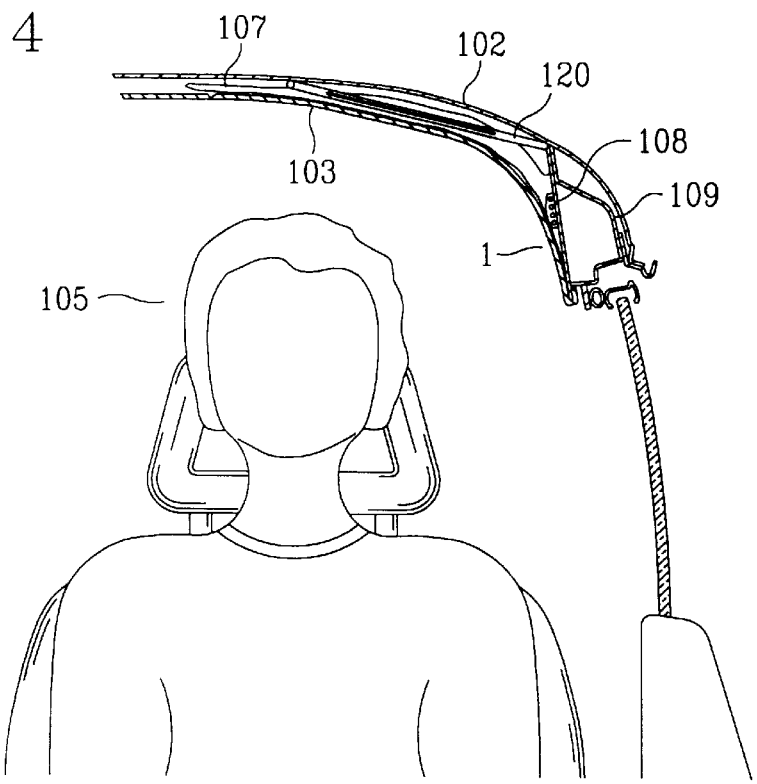
FIG. 4 is a sectional view of the supplemental restraint assembly mounted to a vehicle in a non-deployed state according to an alternate embodiment of the present invention.

FIG. 4 depicts the supplemental restraint assembly according to the preferred embodiment in a non-deployed stored state. An occupant 105 is seated within seat 106 proximate the supplemental restraint assembly 1 similar to the embodiment of FIG. 1. It is noted that the headliner 103 is secured to the roof rail 109 as in the first embodiment and no further embellishment is needed on this point. Furthermore, the air bag 107 material is preferably made of nylon as in the first embodiment.

Figure 5:
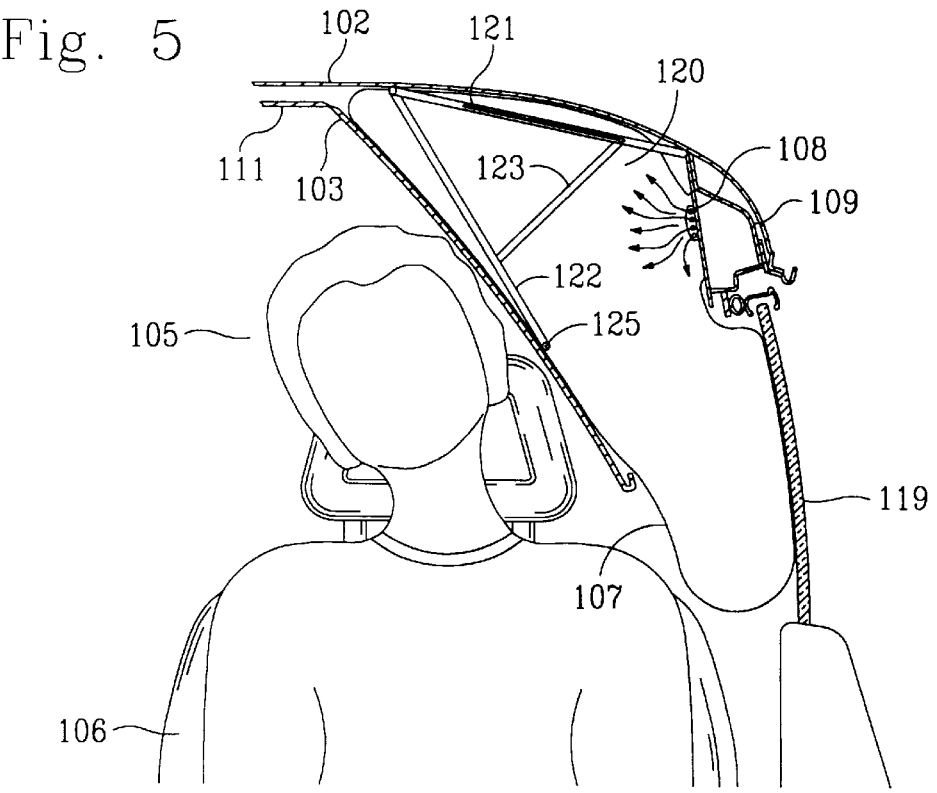
FIG. 5 is a sectional view of the supplemental restraint assembly of FIG. 4 in a deployed state.

Similar to the previous embodiment, an air bag 107 and an inflator 108 are secured to a roof rail 109. The air bag 107 extends inwardly from the roof rail between the headliner 103 and the roof 102. Similar to the previous embodiment, the air bag 107 is inflated to force the headliner 103 down toward the occupant's 5 head and upper torso. However, the preferred embodiment of FIGS. 4–6 includes an additional frame assembly 120 to maintain or hold the headliner/reactionary surface 103 in a deployed position. Referring now to FIG. 5, an air bag 107 is inflated by the discharge of gas from the inflator 108. As the air bag expands, the headliner/reactionary surface 103 is pushed downward toward the occupant's head and upper torso shoulder area. As in the previous embodiment, a longitudinally extending score line 111 is provided in the headliner 103 to facilitate bending about a predetermined line. Once fully deployed the frame assembly 120 maintains the headliner 103 in the downward deployed position.

The frame assembly 120 comprises a fixed frame member 121 secured to the vehicle roof 102 and the roof rail 109. The fixed frame member extends from the roof rail 109 transversely toward the center of the vehicle. A lateral bar 122 is rotatably secured to an inward most end of the fixed frame member 121. Lastly a locking bar 123 is rotatably and slidingly secured to an intermediate portion of the fixed frame member 121 and rotatably secured to the locking bar 123. The locking bar 123 may also be slidingly secured to the lateral bar 122. The fixed frame member 121, lateral bar 122, and locking bar 123 are compactly arranged in parallel fashion when in a stored position as in FIG. 4. As the headliner is forced downward as the air bag 107 inflates, the lateral bar 122 rotates downward and the locking bar 123 slides and rotates to a locking position. The dimensions of the fixed frame member 121, lateral bar 122 and locking bar 123 may be set to create a truss thereby establishing a stable support to maintain the headliner in the downward deployed position. In order for the headliner to be pushed upward, sufficient force must be applied to cause the locking bar 123 to buckle and thus absorbing energy as desired. Consequently, the headliner/reactionary surface 103 may be maintained in the downward deployed position even after the airbag has deflated depending on the desired strength and energy absorption of the locking bar 123. Therefore, a bladder lining the interior of the air bag 107 is not necessary to maintain the downward position of the headliner for an extended period of time.

Figure 6:
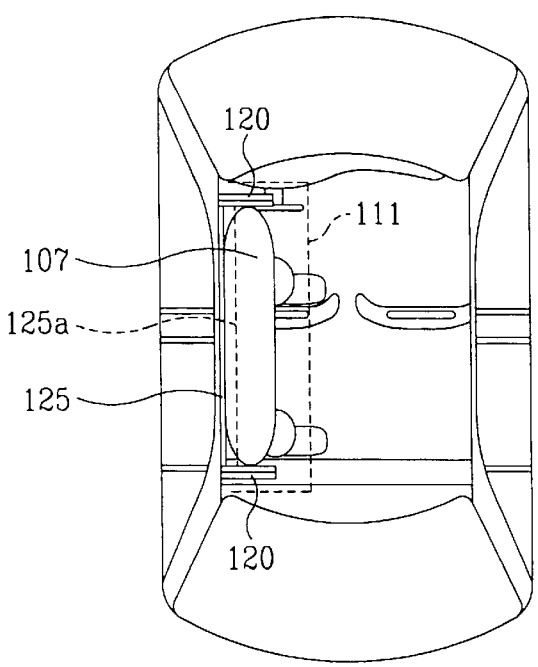
FIG. 6 is a partial schematic top plan view of the vehicle incorporating the supplemental restraint assembly of FIG. 5.

Referring now to FIG. 6, it can be seen that a pair of frame assemblies 120 are located one each adjacent a front a rear side of the vehicle interior. The air bag 108 is completely disposed between each of the frame assemblies 120 and therefore does not longitudinally extend beyond the frame assemblies 120. Such an arrangement allows the unencumbered deployment of the air bag 108 without interference of the frame assemblies 120. In this arrangement each of the lateral bars 122 are interconnected by a crossing bar 125 to provide support for the headliner 103 intermediate the frame assemblies 120. In the stored position the crossing member 125 is stored adjacent the roof rail 109 and is lowered forcing the lateral bar 102 downward during air bag deployment. Thus the headliner 103 is supported longitudinally between the frame assemblies 120 and maintains the headliner 103 in the downward deployed position. The crossing member 125 transfers forces from the expanding air bag to the frame assemblies thereby extending the frame assemblies to the deployed position. Once deployed, the crossing member 125 is positioned adjacent the headliner 103 and therefore does not interfere with the expansion of the air bag. Dashed lines 125a show the crossing member position when the in the deployed position while solid lines 125 depict the crossing member 125 in the stored position. Dashed line 11 indicates the score/fold line about which the headliner rotates during deployment. Alternately, no crossing bar is employed and the lateral bars 122 are secured to the headliner 103. As the air bag forces the headliner downward, the lateral bars 122 are pulled downward and rotating about fixed frame members 121. While no significant force is needed to extend the frame assembly by pulling down the lateral bars 121, the headliner is preferably reinforced in an area proximate the connection to the lateral bars 122 to endure the pulling force. Once the lateral bars 122 are fully rotated and the locking bars 123 locked in place, the frame assembly prevents upward movement of the headliner 103.

Figure 7:
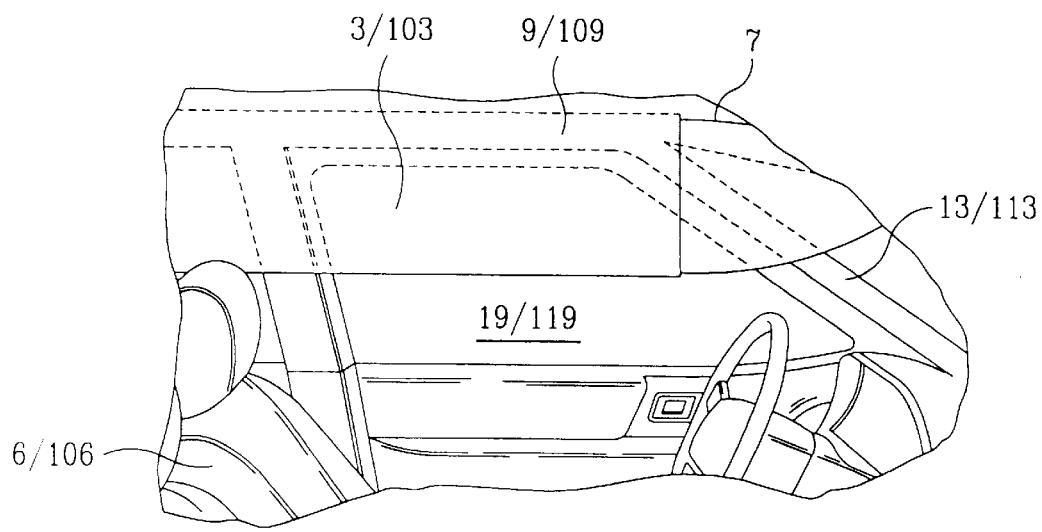
FIG. 7 is an interior view of a vehicle with the supplemental restraint assembly of the present invention in a deployed state.

FIG. 7 depicts the interior of the vehicle with the supplemental restraint assembly of each embodiment in the deployed state. Note the downward position of the headliner 3/103 relative to the side window 20/120, seat 6/106 and front pillar 13/113. In the first embodiment, the single air bag extends forward the front pillar 13 and into the plenum region of the vehicle as indicated by dashed lines 7.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims. For example, while the preferred location of the inflator 8/108 is secured directly to a central portion of the roof rail 9/109, the inflator 8/108 may be remotely located with ducts leading to the air bag through the front or rear pillars. Similarly, the air bag is preferably secured to a central portion of the roof rail 9/109 and allowed to symmetrically expand in the forward and rearward directions. However, the air bag may be secured to either the front or rear pillars and allowed to inflate in a single direction. Moreover, both the roof 2/102 and the roof rail 9/109 may serve as location points for the inflator 8/108 and air bag 7/107.

What is claimed is:

1. A supplemental restraint assembly for a vehicle, said vehicle including a roof, a roof rail disposed between and connecting a front and rear pillar together supporting said roof, and a headliner disposed between an interior of said vehicle and said roof, said supplemental restraint assembly comprising:

an inflatable air bag secured to said roof rail; and an inflator in communication with said air bag, said inflator adapted to inflate said air bag;

wherein when said air bag inflates, said air bag causes at least a portion of said headliner to extend downward within said interior and spaced apart from said roof of said vehicle in a deployed position, said at least a portion of said headliner defining a reactionary surface covering a substantial exposed portion of said air bag to displace forced induced to said air bag from an impacting occupant and being disposed between said occupant and said air bag.

2. The supplemental restraint assembly according to claim 1, wherein said inflator is mounted to said roof rail.

3. The supplemental restraint assembly according to claim 1, wherein said headliner includes a longitudinally extending score line positioned substantially inward said vehicle between said roof rail and a midpoint of said roof such that when said air bag inflates, said air bag extends to at least adjacent said score line forcing said at least a portion of said headliner to pivot about said score line.

4. The supplemental restraint assembly according to claim 1, wherein said air bag includes a single inflatable air bag longitudinally extending from a backlite region located rearward of said rear pillar of said vehicle to a plenum region located forward said front pillar.

5. The supplemental restraint assembly according to claim 4, wherein said air bag includes an outer layer made of woven material and having an inner gas impervious bladder lining an internal surface of said outer layer.

6. The supplemental restraint assembly according to claim 5, wherein said outer layer is made of nylon.

7. The supplemental restraint assembly according to claim 6, wherein said bladder is made of urethane.

8. The supplemental restraint assembly according to claim 1, wherein said headliner includes an inner lining made of propylene Mylar.

9. The supplemental restraint assembly according to claim 1, wherein prior to when said air bag is inflated, said air bag is stored between said roof and said headliner and extends inward said vehicle in a direction traverse to a direction between said front and rear pillars substantially toward a midpoint of said roof.

10. The supplemental restraint assembly according to claim 1, wherein said reactionary surface of said headliner is disposed adjacent said head and torso of said occupant and said score line is positioned directly above said occupant.

11. A supplemental restraint assembly for a vehicle, said vehicle including a roof, a front and rear pillar supporting said roof, and a headliner disposed between an interior of said vehicle and said roof, said supplemental restraint assembly comprising:

an inflatable air bag disposed between said headliner and said roof of said vehicle; and an inflator in communication with said air bag, said inflator adapted to inflate said air bag;

wherein when said air bag inflates, said air bag causes at least a portion of said headliner to extend downward within said interior and spaced apart from said roof of said vehicle in a deployed position to provide a reactionary surface disposed between an occupant of said vehicle and said air bag;

said assembly further comprising:

a frame assembly disposed between said roof and said headliner, said frame assembly extendable between a stored and extended position, wherein when said air bag inflates, said frame assembly extends to sad extended position to positively position said portion of said headliner in said deployed position and maintain said deployed position after deflation of said air bag.

12. The supplemental restraint assembly according to claim 11, wherein said frame assembly comprises:

at least one fixed frame member secured to said roof and transversely extending inward from a first end adjacent a side of said vehicle inward to a second end, at least one lateral bar rotatably secured to said second end of said fixed frame member to engage with said headliner, and at least one locking bar rotatably secured to an intermediate position of said fixed frame member and slidingly and rotatably secured to said at least one lateral bar;

wherein each of said at least one fixed frame member lateral bar and said locking bar are compactly arranged in parallel fashion when said frame assembly is in said stored position and when said frame assembly extends from said stored position to said extended position during inflation of said air bag said lateral bar rotates downward together with said headliner and said locking bar rotates downward about said intermediate position and slides into a locking position to form a fixed truss thereby maintaining said headliner in said deployed position.

13. A supplemental restraint assembly for a vehicle, said vehicle including a roof, a roof rail disposed between a front and rear pillar together supporting said roof, and a headliner being disposed between an interior of said vehicle and said roof and having a longitudinally extending score line located substantially inward said vehicle between a midpoint of said roof and said roof rail, said supplemental restraint assembly comprising:

a single inflatable air bag secured to said roof rail and disposed between said headliner and said roof of said vehicle; and an inflator secured to said roof rail and in communication with said air bag, said inflator adapted to inflate said air bag during an impact event of said vehicle;

wherein when said air bag inflates during said impact event, said single inflatable air bag extends upward and inward said vehicle transverse to a direction between said front and rear pillars and disposed between said headliner and said roof and causes said headliner to bend about said score line and extend downward within said interior in a deployed position thereby establishing a reactionary surface disposed between an occupant of said vehicle and said air bag, said single inflatable air bag further extending forward said headliner and said front pillar substantially into a forward plenum region of said vehicle and rearward of said headliner and said rear pillar substantially into a backlite region of said vehicle.

14. The supplemental restraint assembly according to claim 13, wherein prior to when said single air bag is inflated, said single air bag is stored between said roof and said headliner and extends inward said vehicle in said transverse direction substantially toward a midpoint of said roof and above an occupant.

15. The supplemental restraint assembly according to claim 14, wherein said score line is positioned directly above said occupant.

16. The supplemental restrain system according to claim 13, wherein when said air bag is inflated said reactionary surface of said headliner covers a substantial exposed portion of said air bag to displace forced induced to said air bag from an impacting occupant.

17. A supplemental restraint assembly for a vehicle, said vehicle including a roof, a roof rail disposed between a front and rear pillar together supporting said roof, and a headliner having a longitudinally extending score line and being disposed between an interior of said vehicle and said roof, said supplemental restraint assembly comprising:

an inflatable air bag secured to said roof rail and disposed between said headliner and said roof of said vehicle; and an inflator secured to said roof rail and in communication with said air bag, said inflator adapted to inflate said air bag during an impact event of said vehicle;

a frame assembly disposed between said headliner and said roof and being extendable between a stored position and an extended position, wherein when said air bag inflates, said frame assembly extends to said extended position to positively position said portion of said headliner in said deployed position and maintain said deployed position after deflation of said air bag, said frame assembly including a pair of spaced apart fixed frame members secured to said roof rail and said roof and transversely extending inward from said roof rail, a pair of lateral bars one each rotatably secured to an inward most end of each of said fixed frame members and a pair of locking bars one each rotatably secured to an intermediate position of each of said fixed frame members and slidingly and rotatably secured to a corresponding one of said lateral bars;

wherein each of said frame members, lateral bars, and said locking bars are compactly arranged in parallel fashion when said frame assembly is in said stored position and when said frame assembly extends from said stored position to said extended position during inflation of said air bag said lateral bars rotate downward together with said headliner and said locking bars rotate downward about said intermediate position and slide into a locking position to form a pair fixed trusses thereby maintaining said headliner in said deployed position, said air bag being longitudinally disposed between and longitudinally extending no further than said pair of fixed frame members.

18. A supplemental restraint assembly for use in a vehicle having a headliner located between a vehicle roof and a vehicle interior, said supplemental restraint assembly comprising:

an air bag positionable between said vehicle roof and said vehicle headliner;

an inflator in fluid communication with said air bag; and a frame assembly positionable between said vehicle roof and said vehicle headliner adjacent said air bag, said frame assembly being extendable upon air bag deployment for positioning and holding said headliner in a downward position.

* * * * *